(No Model.) 2 Sheets—Sheet 1.

J. H. JONES.
WALKING CULTIVATOR.

No. 431,981. Patented July 8, 1890.

Witnesses:

Inventor:
James Herra Jones
By A. O. Behel
Attys.

(No Model.) 2 Sheets—Sheet 2.

J. H. JONES.
WALKING CULTIVATOR.

No. 431,981. Patented July 8, 1890.

Witnesses:

Inventor:
James Herva Jones
By A. O. Behel
Atts.

UNITED STATES PATENT OFFICE.

JAMES HERVA JONES, OF ROCKFORD, ILLINOIS, ASSIGNOR TO THE EMERSON, TALCOTT & COMPANY, OF SAME PLACE.

WALKING-CULTIVATOR.

SPECIFICATION forming part of Letters Patent No. 431,981, dated July 8, 1890.

Application filed February 13, 1890. Serial No. 340,328. (No model.)

*To all whom it may concern:*

Be it known that I, JAMES HERVA JONES, a citizen of the United States, residing at Rockford, in the county of Winnebago and State of Illinois, have invented certain new and useful Improvements in Cultivators, of which the following is a specification.

The object of this invention is to construct a spring device employed in cultivators for the double purpose to help raise the drag-bars and hold them suspended and hold the drag-bars at the proper working-level.

Figure 1:
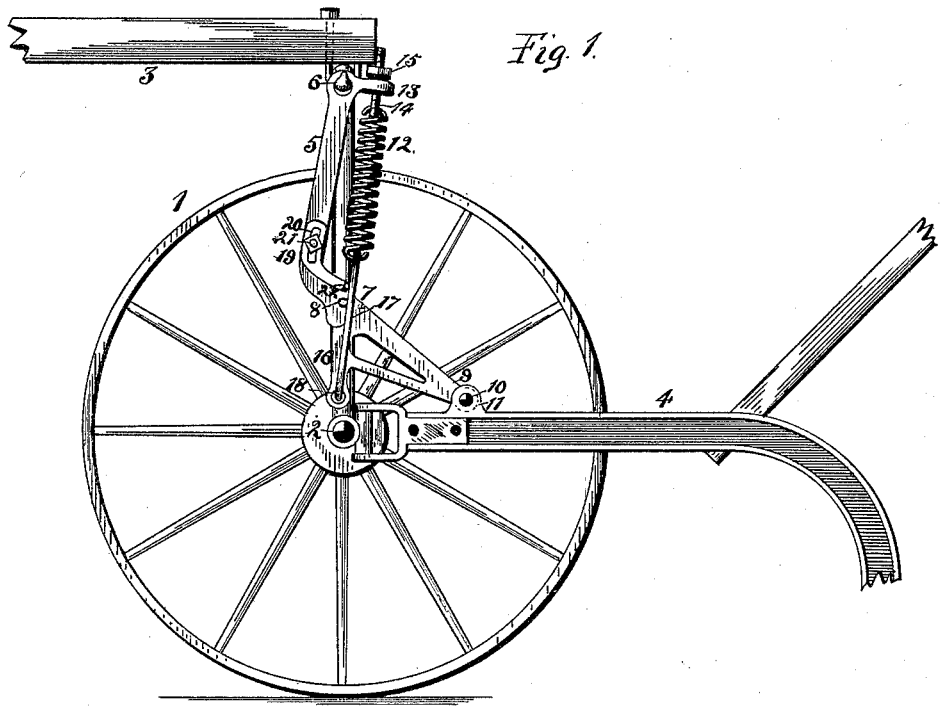
Figure 2:
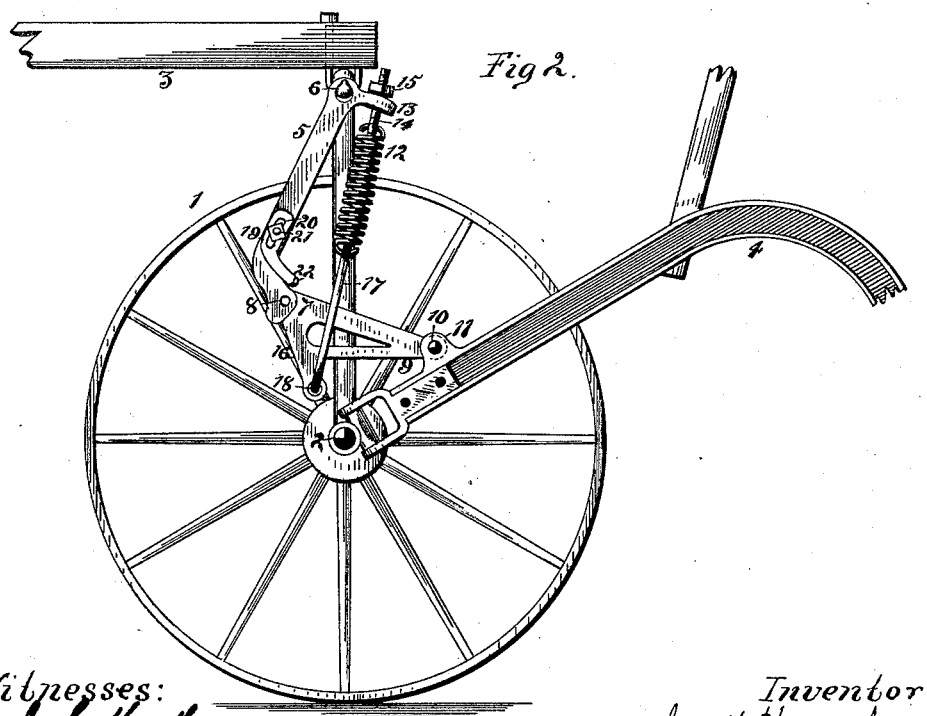
Figure 3:
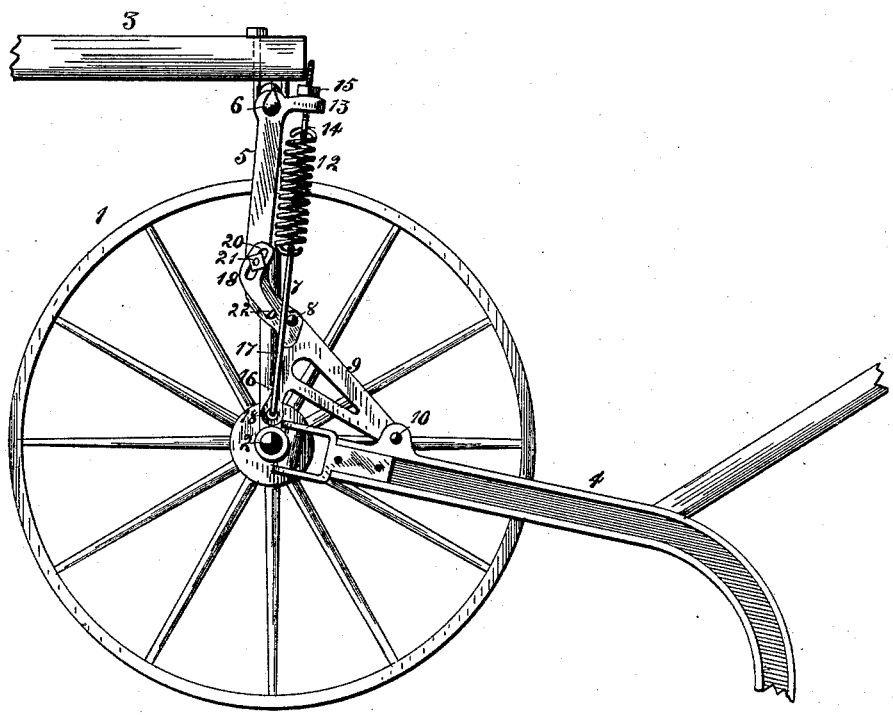

In the accompanying drawings, Figure 1 is a side elevation of my improved cultivator with one wheel removed and the drag-bar in a horizontal position. Fig. 2 is also a side elevation with the drag-bar elevated. Fig. 3 is a side elevation of the cultivator, showing the drag-bar in its working position pressed to the ground by the tension of the spring.

The main portions of the cultivator herein shown are of the usual construction, and consist of the carrying-wheels 1, axle 2, supported therein, a tongue 3, held in place on the arched portion of the axle, and the drag-bars 4, having the usual connection with the axle, so as to move in vertical and horizontal planes. The spring arrangement consists of two levers having a pivotal connection with each other, and a connection with the main frame and drag-bar, and a spring so connected as to exert an upward force on the drag-bar when in one position, and a downward force when it is required to hold the shovels in the ground.

The lever 5 is suspended from the axle by its upper end, being in eye form and hooked into the stud 6, projecting from the axle. The lower end of this lever is bifurcated, in which is placed one end of the lever 7, and has a pivotal connection therewith by a bolt or pin 8 passing through the parts. The long arm 9 has a pivotal connection with the drag-bar some distance in rear of the drag-bar connection with the axle by a bolt or pin 10 passing through its eye-formed end and the uprising ears of the drag-bar.

A spiral spring 12 has a connection with an arm 13, projecting rearwardly from the upper end of the lever 5, by a screw-threaded link 14, passing through the perforation in the arm, and a screw-nut 15 holds it in position. The lower end of the spring has a connection with the lower branch 16 of the lever 7 by a link 17, having an eye in its upper end, into which is hooked the end of the spring, and the lower end of the link is in hook form and enters the eye 18 in the lower end of the branch 16.

To the side of the lever 5, near its lower end, is adjustably secured a stop 19 for limiting the downward force of the spring exerted on the drag-bar. This stop is slotted, as at 20, and a bolt 21 passes through the slot and lever and receives a screw-nut on its projecting end, by means of which the stop is made adjustable in its connection with the arm and can be held when adjusted. The free end of the stop has its end 22 bent so that the link 17 will come in contact therewith, as shown at Fig. 1.

By the above construction of a spring counter-balance to the drag-bar I produce an arrangement of parts few in number and easily placed together. When the spring force exerted is in a line drawn through the pivotal point 8 of the two levers 5 and 7, its force will be neutral, and when the line of force is forward of said pivot the drag-bars will be pressed downward, thereby forcing the shovels into the ground, and when the line of force is in rear of said pivot the tendency will be to raise the drag-bars and hold them suspended, as shown in Fig. 2.

By the employment of the adjustable stop I am able to hold the drag-bars horizontally suspended by reason of the link 17 coming in contact with the stop, as shown at Fig. 1, thereby counterbalancing the weight of the drag-bars by the spring action, and the stop can be so adjusted as to hold the drag-bars suspended at any place best adapted for different kinds of cultivation, and by reason of the screw-nut 15 the tension of the spring can be regulated for different weights of drag-bars and shovels attached thereto.

I claim as my invention—

1. In a cultivator, the combination of a supporting-frame, drag-bars connected thereto, two levers having a pivotal connection with each other, one of said levers having a pivotal connection with the supporting-frame and the other with the drag-bar, and a spring adapted to produce either a lifting or depressing effect on the beam according to the relative position of the line of draft with the centers of the levers, substantially as set forth.

2. In a cultivator, the combination of a supporting-frame, drag-bars connected thereto, two levers having a pivotal connection with each other, one of said levers having a pivotal connection with the supporting-frame and the other with the drag-bar, and a spring connected with the last-named lever and with a suitable support, substantially as set forth.

3. In a cultivator, the combination of a supporting-frame, drag-bars connected thereto, two levers having a pivotal connection with each other, one of said levers having a pivotal connection with the supporting-frame and the other with the drag-bar, a spring connected with the last-named lever and with a suitable support, and a stop located on one of said arms to limit the downward force of the spring, substantially as set forth.

JAMES HERVA JONES.

Witnesses:
L. L. MILLER,
A. O. BEHEL.